(12) United States Patent
Edwards

(10) Patent No.: US 9,001,698 B2
(45) Date of Patent: Apr. 7, 2015

(54) SYSTEMS AND METHODS FOR OPTIMIZING THE DISTRIBUTION OF POINT-TO-POINT AND BROADCAST MESSAGES IN A LAYERED MESH NETWORK

(75) Inventor: Bruce H. Edwards, Johns Creek, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 253 days.

(21) Appl. No.: 13/228,737

(22) Filed: Sep. 9, 2011

(65) Prior Publication Data
US 2013/0064159 A1 Mar. 14, 2013

(51) Int. Cl.
*H04L 12/28* (2006.01)
*H04L 12/18* (2006.01)

(52) U.S. Cl.
CPC ................... *H04L 12/189* (2013.01)

(58) Field of Classification Search
None
See application file for complete search history.

(56) References Cited

U.S. PATENT DOCUMENTS

| | | | |
|---|---|---|---|
| 2010/0188254 A1* | 7/2010 | Johnson et al. | 340/870.02 |
| 2011/0075704 A1 | 3/2011 | Bettendorff | |
| 2011/0228788 A1* | 9/2011 | Thubert et al. | 370/400 |
| 2011/0235562 A1* | 9/2011 | Tong et al. | 370/312 |
| 2011/0255461 A1* | 10/2011 | Huang et al. | 370/312 |
| 2013/0028295 A1* | 1/2013 | Hui et al. | 375/135 |

FOREIGN PATENT DOCUMENTS

| | | |
|---|---|---|
| WO | 2008050958 | 5/2008 |
| WO | 2013036425 | 5/2013 |

OTHER PUBLICATIONS

Kirachaiwanich et al., "Improving Performance of Multi-Radio Frequency-Hopping Wireless Mesh Networks", Wireless Algorithms, Systems, and Applications, Springer Berlin Heidelberg, Berlin, Heidelberg, Aug. 11, 2011, pp. 134-145.
PCT/US2012/053017, "International Search Report and Written Opinion", Dec. 4, 2012, 9 pages.

* cited by examiner

*Primary Examiner* — Christine Duong
(74) *Attorney, Agent, or Firm* — Kilpatrick Townsend & Stockton LLP

(57) ABSTRACT

Various aspects of the present invention relate to optimizing the distribution of point-to-point and broadcast messages in a layered mesh network of nodes. In one aspect, a node in the mesh network identifies a point-to-point frequency for sending a point-to-point message to a preferred node, which facilitates communication with a collector node. The node also identifies a broadcast frequency of the preferred node that is distinct from the point-to-point frequency. According to one configuration, the broadcast frequency is offset a predetermined number of frequency channels from the point-to-point frequency. In addition to listening on the broadcast frequency, the node further identifies and listens on a receive frequency for point-to-point messages from other nodes.

21 Claims, 3 Drawing Sheets

SYSTEMS AND METHODS FOR OPTIMIZING THE DISTRIBUTION OF POINT-TO-POINT AND BROADCAST MESSAGES IN A LAYERED MESH NETWORK

TECHNICAL FIELD

This invention relates generally to routing information in a network and more specifically to using different frequencies for point-to-point messages and broadcast messages.

BACKGROUND

Effective communication in mesh networks can depend on timely, reliable exchanges of information between radio nodes in the mesh network. Effective communication can therefore necessarily depend on the efficient distribution of point-to-point and broadcast messages in the mesh network. Existing networks can struggle in this regard in part because nodes within the networks are not configured to efficiently handle both point-to-point and broadcast messages. The nodes may instead treat both types of messages in the same manner, which can slow performance at the node and therefore throughout the entire network. Existing networks may be optimized for either point-to-point message distribution or broadcast distribution, but not both. For example, sending a message intended for all nodes in a network optimized for point-to-point distribution can be time-consuming and inefficient as every node receiving a broadcast message has to repeatedly transmit the message to each node on its neighbors list. Considering that there is a great deal of overlap of neighbors lists in nearby nodes, broadcasting messaging via point-to-point distribution can cause an avalanche of redundant message traffic. On the other hand, sending a message that is intended for only one node on a network that is optimized for broadcast distribution is very inefficient. Every node on the network must listen for messages on all frequencies. They must receive and decode all messages transmitted by every other node in the vicinity to determine if the message is intended for them. Therefore, an alternative that enables faster and more efficient distribution of both point-to-point and broadcast messages in a mesh network is desirable.

SUMMARY

Various aspects of the present invention relate to optimizing the distribution of point-to-point and broadcast messages in a layered mesh network of nodes. In one aspect, a node in the mesh network identifies a point-to-point frequency for sending a point-to-point message to its preferred node, which facilitates communication with a collector node. The node also identifies a broadcast frequency of the preferred node that is distinct from the point-to-point frequency. According to one configuration, the broadcast frequency is offset a predetermined number of frequency channels from the point-to-point frequency. According to another configuration, the point-to-point frequency is selected from a predetermined number or range of frequencies and the broadcast frequency is selected from a different predetermined number or range of frequencies. In addition to listening on the broadcast frequency of its preferred node, the node also listens on its own point-to-point frequency for messages from other nodes.

Another aspect of the present invention is related to a system that includes a collector node and a preferred node in a first layer logically closer to the collector node than a node in a second layer. The preferred node facilitates communication to the collector node. The node in the second layer identifies a point-to-point frequency for sending a point-to-point message to the preferred node and identifies a broadcast frequency of the preferred node for receiving a broadcast message. The node in the second layer also identifies a receive frequency for communicating point-to-point messages with a node in the third layer. The node in the second layer listens to both the broadcast frequency of its preferred node and its own receive frequency.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
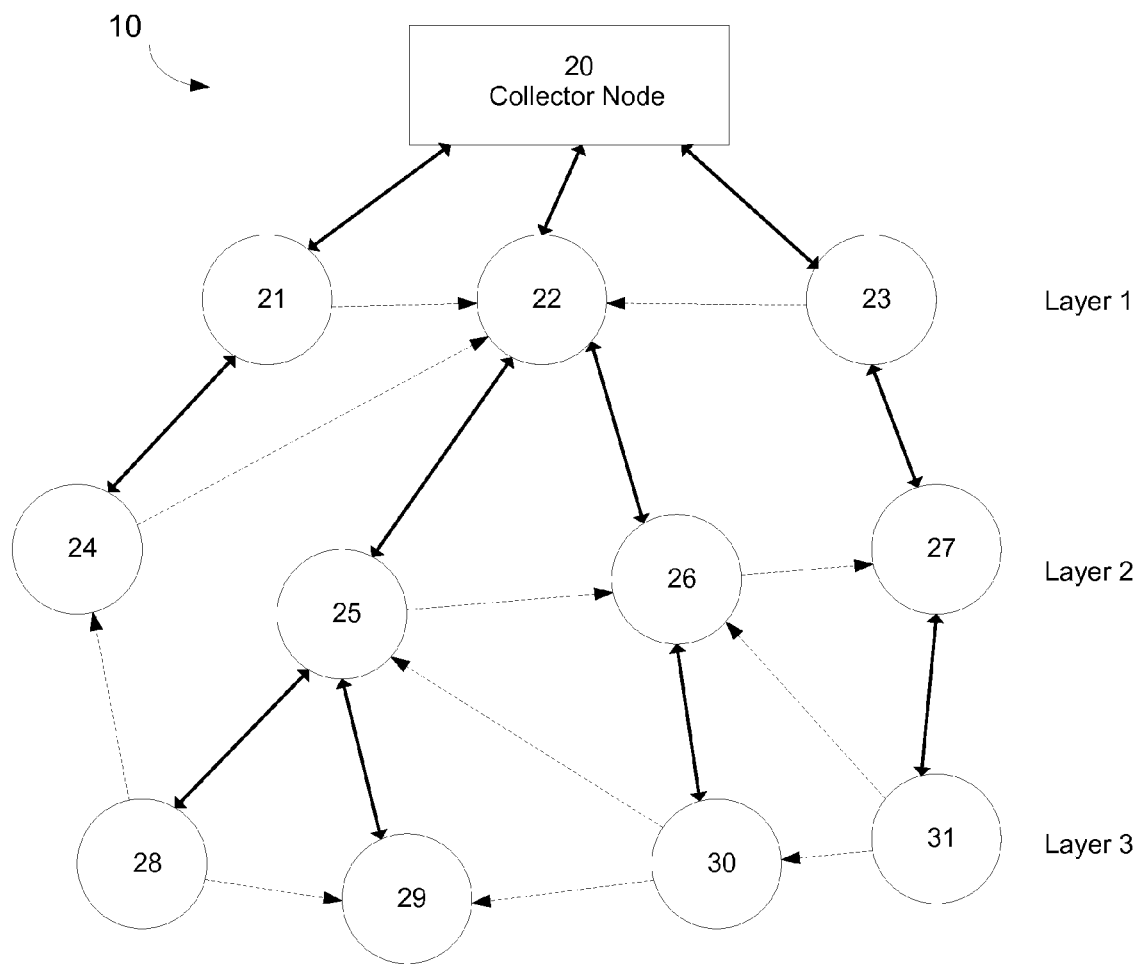
FIG. 1 depicts an exemplary mesh network in which point-to-point and broadcast messages are distributed by the nodes in the mesh network and further depicts tracking amongst nodes in the exemplary mesh network.

Aspects of the present invention relate to optimizing the distribution of point-to-point and broadcast messages in a layered mesh network of radio nodes. Such optimization can be accomplished by each node in the mesh network establishing and maintaining relationships with other nodes in the mesh network. For example, each node can acquire or identify other nodes with which it can communicate (commonly referred to as neighboring nodes) and obtain certain information about these nodes to facilitate communication. Such information can include a point-to-point frequency on which identified nodes listen for messages intended only for those nodes, i.e., point-to-point messages, and certain performance related metrics. Nodes can use the metrics to score each of the nodes they identified to determine which identified node provides the best option for sending information to a destination and for receiving messages, i.e., a preferred node. In a layered mesh network, the identification of the preferred node also considers the layer associated with the node.

By identifying other nodes as explained, each node establishes its own network of nodes which it can leverage for sending and receiving information in the mesh network. Particularly, each node has a point-to-point or receive frequency on which it listens for point-to-point messages intended for that node. Each node also simultaneously tracks its own point-to-point receive frequency and the broadcast frequency of its preferred node. Thus, a node can rely on its preferred node for receiving broadcast messages from a host or other nodes, for example. In some implementations, a node may track a broadcast frequency for more than one node to improve the chances that the node will receive a broadcast message.

A node can determine the broadcast frequency of its preferred node based on a relationship between the preferred node's receive frequency and its broadcast frequency. For example, a node can become aware of the preferred node's receive frequency as part of the process of identifying nodes. The preferred node's broadcast frequency can then be determined based on an offset of a predetermined number of frequency channels from the receive frequency, in one configuration. According to this configuration, each node can frequency hop for its preferred node's receive frequency and then use the receive frequency to determine the broadcast frequency of its preferred node. Implementations herein emphasize nodes having a receive frequency that is distinct from the broadcast frequency of their preferred node.

Layers of nodes in the mesh network can be formed as each node identifies neighboring nodes and selects a preferred node. In one configuration, nodes that have the greatest connection quality to a shared destination node, e.g., collector node, based on certain performance metrics can be considered layer 1 nodes. Such nodes can be said to be logically closer to the collector node than other nodes. Nodes that have reduced connection quality to the collector node can be considered layer 2 nodes, and so forth, such that nodes can be tiered in the mesh network based on their performance in relation to other nodes. Many layers of nodes may exist in the mesh network in other examples.

Nodes track their acquired nodes, but can become out of sync as a result of clock drift. Maintaining clock synchronization of acquired or identified nodes using broadcast messaging allows all nodes with a common preferred node to synchronize on a single message transmission. Using point-to-point messaging for synchronization requires message traffic between all nodes, which is an inefficient use of network bandwidth.

As defined herein, a "node" includes an intelligent device capable of performing functions related to distributing messages in a mesh network. In one system, a node can be a meter located at a facility, such as a house or apartment, that measures the consumption of a utility such as gas, water, or electric power. Such a meter can be part of an advanced metering infrastructure (AMI), radio frequency (RF) network. Other examples of nodes include a router, collector or collection point, host computer, hub, or other electronic device that is attached to a network and is capable of sending, receiving, or forwarding information over a communications channel.

A node can contain several components that enable it to function within implementations of the present invention. For example, a node can include a radio that can enable it to communicate with like nodes and/or other devices in the mesh network. The radio of each node may have a programmable logic controller (PLC)-like device that can enable the radio to function like a computer, carrying out computer and command functions to provide implementations of the present invention described herein. A node may also include a storage medium for storing information related to communication with other nodes. Such storage mediums can include a memory, a floppy disk, CD-ROM, DVD, or other storage devices located internal to the node or accessible by the node via a network, for example. A node may also include a crystal oscillator to provide time-keeping and a battery to provide back-up power. Some nodes may be powered only by a battery.

A node can communicate with other nodes in the mesh network over various frequency channels. Nodes that share the same frequency hopping sequence, i.e., hop between frequencies at the same time, can communicate with each other over the same frequency. Thus, in a frequency channel hopping network, nodes can hop at different times to establish communication with other nodes over the available frequency spectrum, e.g., 240 channels according to exemplary implementations herein. A node can hop according to a certain time increment or dwell time, e.g., 700 milliseconds, at which time the node can transmit or receive a message over a given channel or frequency. The point-to-point and broadcast frequencies described herein can exist within the 240 channel frequency range, for example, and can be separated by some time increment, such as 700 milliseconds, which can represent the "space" between frequency channels. Thus, according to an exemplary implementation, 240 separate communications can occur simultaneously in the mesh network, each communication occurring on a separate channel. Such communications can utilize the entire bandwidth of the 240 channel network.

As used herein, "point-to-point" refers to communication between two nodes. A point-to-point message refers to a message or information that is sent between two nodes. A point-to-point frequency refers to the frequency channel used between the two nodes for sending and receiving a point-to-point message. A point-to-point frequency for receiving a point-to-point message may also be referred to herein as a "receive frequency" to indicate that information is received on the referenced frequency. In examples herein, a point-to-point message can be intended for a particular node and can be distinguished from a broadcast message in this way.

"Broadcast," as used herein, refers to the distribution of information simultaneously to multiple nodes in the mesh network. Thus, broadcast messages can be intended for some or all of a group of the nodes in the mesh network. "Broadcast frequency" refers to the frequency channel on which the information is sent by a node desiring to distribute the information. Other nodes that are listening on the broadcast frequency can receive the broadcast information.

FIG. 1 depicts an exemplary mesh network 10 configured to implement systems described herein. The mesh network 10 can include a collector node 20 and radio nodes 21-31. The collector node 20 can serve as a collection point to which the nodes 21-31 may send information, such as measurements of the consumption of gas, water, or electric power at a facility associated with the node. Nodes 21-31, as previously discussed, can have sufficient networking and computing capability to communicate with other nodes in the mesh network and to make intelligent determinations to facilitate such communication. The "collector node" can be configured to have at least the same functionality and capabilities present in nodes 21-31. Additionally, the collector node 20 may include sufficient storage capability for storing information from nodes 21-31 and, in some examples, greater computing capability to process the information received from the nodes. In other examples, a command center or other computing device (not shown) can be used to process the information received from the nodes.

Three layers of nodes in the mesh network 10 are shown in FIG. 1 (layer 1, layer 2, and layer 3). Fewer or more layers may exist in other configurations. Nodes can be associated with a particular layer based on certain factors, such as a node's logical distance to the collector node 20 and the reliability of its data transmissions. The factors and/or the weights given to the factors may vary with different networks. Nodes located on layer 1 indicate that they have a "better" connection to the collector node 20, and do not require the use of an intervening node to communicate with the collector node 20. Nodes located on higher layers communicate with the collector node 20 through at least one intervening node. For example, nodes located on layer 2 have a preferred connection to a layer 1 node and nodes located on layer 3 have a preferred connection to a layer 2 node. Thus, a layer 3 node communicates with the collector node through its preferred layer 2 node, which in turn communicates with its preferred layer 1 node, which communicates with the collector. While FIG. 1 shows layer 1 nodes being closer to the collector node 20 than layer 2 nodes, and layer 2 nodes closer than layer 3 nodes, the layers may not be determined solely by physical distance. A layer 1 node may be located further away from the collector node 20 than a layer 2 node, depending upon the manner in which the nodes are evaluated.

The solid lines in FIG. 1 represent preferred relationships and the dotted lines represent tracking relationships. For example, the solid line connecting nodes 21 and 24 illustrates that node 21 is the preferred node for node 24 and that node 21 and 24 can communicate with each other. The dotted line connecting node 24 and 22 indicates that node 24 is also tracking node 22. Each node tracks nodes in addition to its preferred node to perform continuous network optimization and rapid self healing in the event communication to its preferred node is lost.

Figure 2:
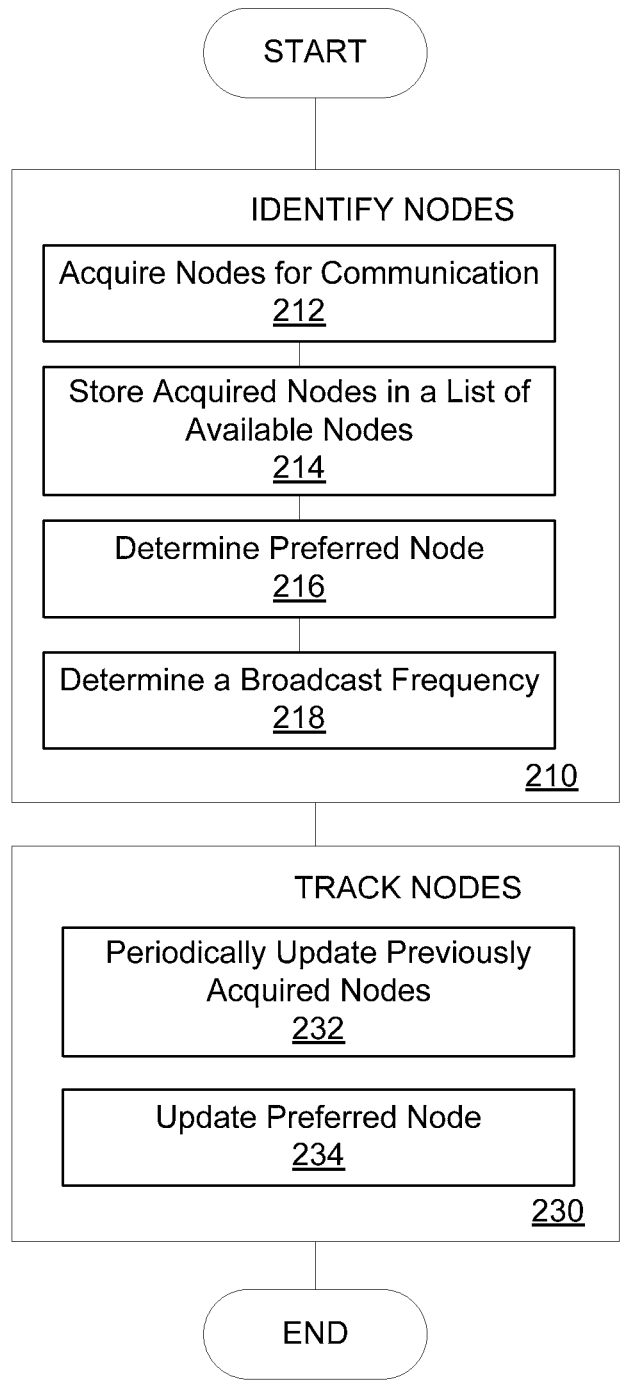
FIG. 2 is a flowchart illustrating an exemplary method for optimizing the distribution of point-to-point and broadcast messages in the mesh network of FIG. 1.

FIG. 2 is an exemplary flowchart for optimizing the distribution of point-to-point and broadcast messages in the mesh network 10. Each node can identify nodes for communication at step 210. Such identification can involve acquiring the nodes at step 212. In one implementation, nodes can be acquired based on whether they are in communication range and are capable of communicating with the acquiring node. In one implementation; such a determination can be made by a node sending a broadcast message with a request for a response on a predetermined group of frequency channels. Nodes that are listening on the predetermined frequency channels can receive the message and respond accordingly. Another implementation can involve sending a point-to-point message with an acknowledgement request to various frequencies and listening for a response on those frequencies. In either implementation, the acquiring node can identify the frequency on which it received a response from the acquired node as the acquired node's receive frequency. Acquired nodes can be added to a list of neighboring nodes which the acquiring node can rely on for communication (step 214). The list of neighboring nodes can be stored in a memory at the node or at a remote device with sufficient storage capability, according to some configurations. The acquired node may provide various information such as performance-related metrics upon being acquired. Additional information that may facilitate communication between a node and its acquired nodes may also be collected and stored and other techniques for identifying nodes employed.

A preferred node for each of the nodes in the mesh network 10 can be determined at step 216. A preferred node can be a node in the mesh network 10 that can receive and route information from another node in some way better than other available nodes. "Better" can mean, in one example, that the preferred node has obtained a higher score based on certain metrics than did other nodes that were acquired in step 212, for example. Such metrics can include distance to a target node, e.g., collector node 20, the layer associated with a node, transmission time, baud rate, tickle success rate, data success rate, and other measurements of a node's communication performance.

Various combinations and weightings of the metrics can be used to determine a score for each acquired node. The node with the highest score can be selected as the preferred node. The preferred node can be relied upon by the node that selected it as its preferred node for receiving its point-to-point messages for the collector node 20 and for broadcasting broadcast messages. Each node can select a preferred node in a layer closer to the collector node 20. For example, as indicated by the solid lines in FIG. 1, the collector node 20 is a preferred node for layer 1 nodes 21-23, node 22 is a preferred node for layer 2 nodes 25 and 26, and node 26 is a preferred node for layer 3 node 30. Node 30 tracks nodes 25, 26 and 29, but selected node 26 as its preferred node because node 26 received a higher score than the other nodes.

The criteria for selecting a preferred node may vary for each node. For instance, node 24 may have selected node 21 as its preferred node based on a comparison of transmission time and data success rate, whereas node 29 may have selected node 25 as its preferred node based on distance to the collector node and baud rate. The same selection criteria can be used by all of the nodes in the mesh network 10 in other instances.

Figure 3:
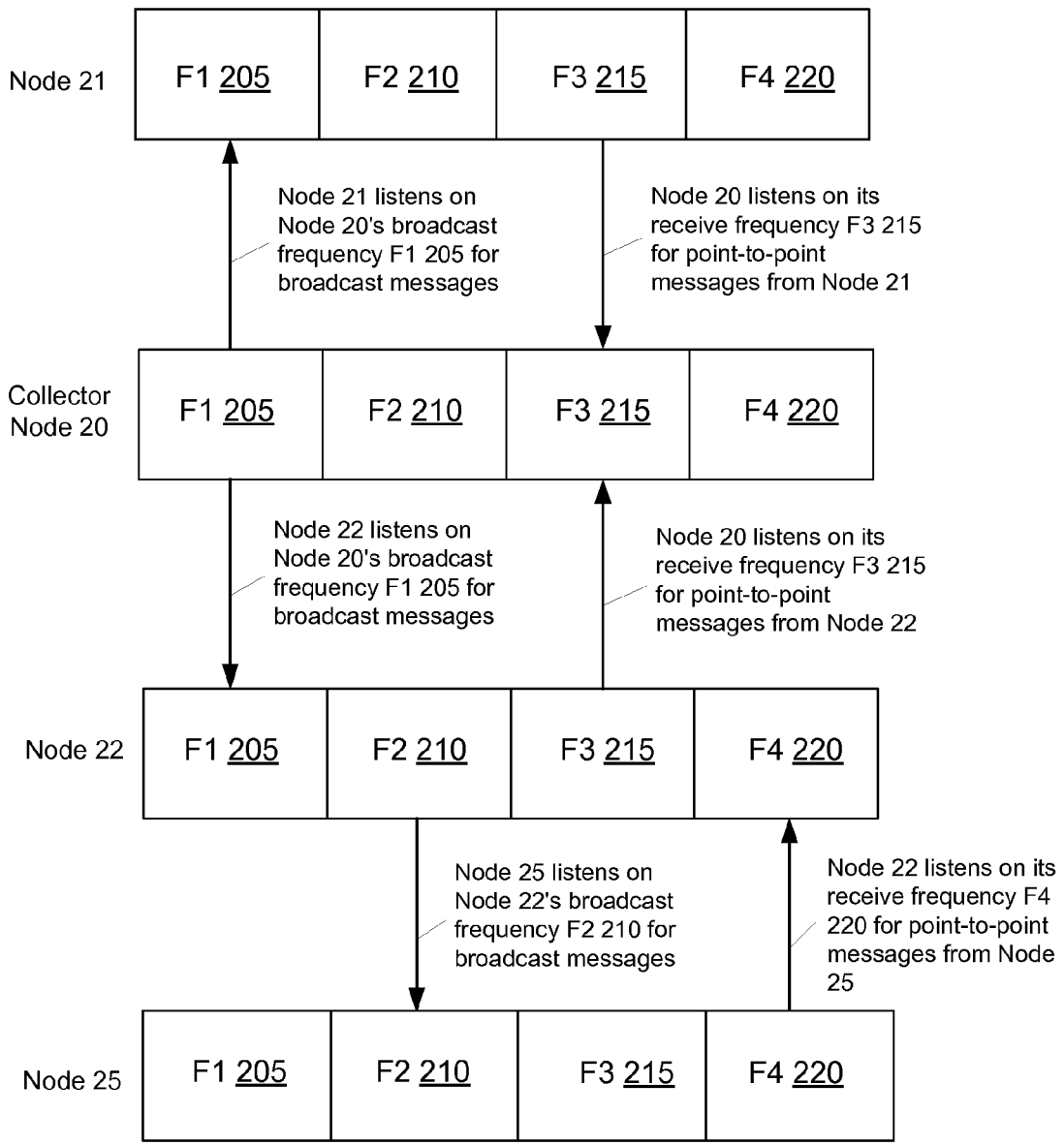
FIG. 3 is a diagram illustrating the relationship between point-to-point and broadcast frequencies for preferred nodes in the mesh network of FIG. 1.

A broadcast frequency for at least the preferred node in the mesh network 10 can be determined at step 218. The broadcast frequency can be based on an acquired node's receive frequency identified during the acquisition process (step 212). According to one example, the broadcast frequency is offset a predetermined number of frequency channels from the receive frequency. For example, as illustrated in FIG. 3, node 22 listens for point-to-point messages on receive frequency F4 220 from node 25 and listens for broadcast message from the collector node on frequency F1 205. Node 22 also broadcasts messages on broadcast frequency F2 210. Thus, an offset of ten frequency channels exists between the receive frequency and broadcast frequency for node 22. According to one system, a predetermined offset of at least one frequency channel may be required to prevent interference with message transmission. Various other examples can rely on different predetermined offsets or may use factors and/or logic other than a predetermined offset to determine a relationship between a node's receive frequency and its broadcast frequency.

During its acquisition process at step 212, node 25 can identify preferred node 22's receive frequency F4 220. Node 25 can therefore send a point-to-point message to preferred node 22 on frequency F4 220. Node 25 can also listen on the predetermined offset broadcast frequency F2 210 for broadcast messages from node 22. Similarly, each node in the mesh network 10 can identify and listen on the broadcast frequency of its preferred node to receive broadcast messages. A broadcast frequency may also be identified and listened to for nodes other than preferred nodes, in some implementations.

The relationship between point-to-point and broadcast frequencies described in step 218 of FIG. 2 can be used to distribute messages in the mesh network 10 shown in FIG. 1. An example in which a point-to-point message is distributed between node 25 and collector node 20 is now considered. As indicated by the solid connection lines in FIG. 1, node 25 can communicate with its preferred node 22, which can send messages directly to the collector node 20. Because node 25 selected node 22 as its preferred node (step 216), it can send information intended for the collector node 20 to node 22 on node 22's receive frequency F4 220. Since node 22 is a layer one node, it can communicate the information received from node 25 directly to the collector node 20 using the collector node's receive frequency F3 215. In addition to listening for point-to-point message on its receive frequency, node 22 also listens for broadcast messages from the collector node 20 on the collector node's broadcast frequency F1 205. If node 22 receives a broadcast message, then it re-broadcasts the broadcast message using its broadcast frequency F2 210.

Since the collector node is also a preferred node for nodes 21 and 23, these nodes all listen for a broadcast message from collector node 20, on broadcast frequency F1025, as well as listening to their own receive frequencies for point-to-point messages. Therefore, when a message is broadcast from collector node 20, nodes 21-23 can receive the message simultaneously.

In addition to listening on the broadcast frequency of its preferred node, a node can also listen on the broadcast frequency of other nodes to, for example, improve the likelihood of receiving a broadcast alert or emergency message or to improve the speed of delivery of the broadcast message. Node 30 in FIG. 1, for example, could listen on the broadcast frequencies of each of the nodes that it is tracking, e.g. nodes 25, 26 and 29. If the emergency affects the operation of some of the nodes in the network, then listening to multiple broadcast frequencies increases the likelihood that the node receives the message in a timely manner.

A broadcast message may be sent without requiring an acknowledgement. If so, then the broadcast message may be sent multiple times to increase the likelihood that all of the nodes receive the message. In other implementations, an acknowledgment of the broadcast message may be required to confirm that other nodes received the broadcast message. Any nodes that do not acknowledge the broadcast message can be sent a point-to-point message.

According to some configurations, each node can frequency hop across a band of frequency channels in a split arrangement. For example, if there are 240 available frequency channels, they can be split such that 190 channels are used for point-to-point communication while the remaining 50 channels are used for broadcast communication. A node functioning in this arrangement can therefore listen on its receive frequency in the 190-channel band for point-to-point messages and send messages to its preferred node using a frequency in the 190-channel band, while also listening on each of the 50 broadcast frequencies for broadcast messages from its preferred node and possibly other nodes.

Under another configuration, a predefined number and range of frequency channels can be reserved for the use of battery backed nodes. Nodes that are in range of the battery backed nodes can frequency hop across the predefined channels to receive messages from the battery backed nodes that enable the non-battery backed nodes to more quickly locate preferred nodes in response to electric power being restored after an electric power outage. Such functionality can facilitate faster establishment of layers than what would be experienced from a network without battery backed nodes after a power outage. Ten channels are reserved for battery backed nodes in an exemplary configuration but fewer or more may be reserved in other configurations. In one configuration, a node initially tries to locate a battery backed node using the reserved channels. As the network becomes established, the node may thereafter resume normal operations, including the search for a preferred node regardless of whether that node is a battery backed node.

The relationship between nodes in the mesh network 10 may change over time. Each node's list of acquired nodes can be tracked at step 230, which involves updating the list at step 232. In one example, tracking can be used to synchronize time kept by a node and its acquired nodes. The receive frequencies may become out of synchronization because, for example, the clocks that keep time in the nodes gradually drift apart. Thus, tracking can involve each node contacting its acquired nodes to receive an updated frequency for communication. Updating the list of acquired nodes may also result in nodes that were previously acquired no longer being available for communication. Such nodes can be culled from the list of acquired nodes in one example, while they can remain on the list as a result of being registered at the node or another device, in another example. Nodes that were previously unavailable may become available. Such nodes could have been added to the mesh network 10 after the initial acquisition process or could have been experiencing communication problems at the time of the initial acquisition process, as examples.

In addition to updating the acquired nodes, the preferred node for each node can also be updated at step 234. As the relationship between nodes changes, newly acquired nodes, for example, may have a better connection to the collector node 20 and therefore may become the preferred node. Nodes that previously shared the same preferred node may later rely on different preferred nodes. For example, nodes 25 and 26 each share node 22 as their preferred node (as shown in FIG. 1), but node 25 may later select node 21 as its preferred node while node 26 can continue to rely on node 22. As another example, previously identified nodes may become associated with a different layer. For example, node 27 is shown as a layer 2 node but it may later become a layer 1 node, e.g., based on its improved communication performance.

Many other modifications, features and aspects of the present invention will become evident to those of skill in the art. For example, aspects herein describe a single node that is capable of distributing point-to-point and broadcast messages. It is also possible that two radios can work in conjunction at a node to provide similar functionality. For example, a first of the two radios can be dedicated to point-to-point communications while the second radio can be dedicated to broadcast communications. Accordingly, it should be understood that the foregoing relates only to certain aspects or implementations of the invention, which are presented by way of example rather than limitation. Numerous changes may be made to the examples described herein without departing from the spirit and scope of the invention as defined by the following claims.

What is claimed is:

1. A method comprising:
   identifying, at a node in a mesh network, a point-to-point frequency for communicating a point-to-point message to a preferred node, wherein the preferred node facilitates communication to a collector node;
   identifying, at the node, a broadcast frequency of the preferred node, wherein the broadcast frequency is distinct from the point-to-point frequency;
   identifying, at the node, a receive frequency for receiving a point-to-point message from a lower layer node;
   simultaneously listening, at the node, to both the broadcast frequency and the receive frequency, wherein the broadcast frequency is different from the receive frequency;
   receiving a broadcast message at the node on the broadcast frequency; and
   sending the broadcast message using a second broadcast frequency, wherein the second broadcast frequency is associated with the node.

2. The method of claim 1 wherein the node determines the broadcast frequency based on the broadcast frequency being offset a predetermined number of frequency channels from the point-to-point frequency identified by the node.

3. The method of claim 1 wherein the preferred node is selected by the node from a plurality of nodes based on a comparison of at least one of transmission time, baud rate, tickle success rate, and data success rate.

4. The method of claim 3 wherein the preferred node is selected by the node from a plurality of nodes based on the preferred node's logical proximity to the collector node.

5. The method of claim 4 further comprising, subsequent to the selection of the preferred node, selecting another node as a subsequent preferred node that facilitates communication to the collector node.

6. The method of claim 1 wherein the lower layer node identifies the receive frequency as the node's point-to-point frequency for sending a point-to-point message to the node.

7. The method of claim 6 wherein the point-to-point frequency for sending a point-to-point message to the node is distinct from the second broadcast frequency.

8. The method of claim 1 further comprising:
hopping, by the node, between a predetermined plurality of frequencies reserved for point-to-point communication and a second predetermined plurality of frequencies reserved for broadcast communication.

9. A system comprising:
a collector node in a mesh network;
a preferred node in a first layer of the mesh network, wherein the preferred node is configured to facilitate communication to the collector node; and
a second-layer node in a second layer of the mesh network, wherein the second-layer node is configured to identify a point-to-point frequency for sending a point-to-point message to the preferred node and to identify a broadcast frequency of the preferred node for receiving a broadcast message from the preferred node, wherein the second-layer node is further configured to identify a receive frequency for receiving a point-to-point message from a third-layer node in a third layer, and wherein the second-layer node is further configured to simultaneously listen to both the broadcast frequency of the preferred node and the receive frequency, wherein the broadcast frequency is different from the receive frequency, wherein the second-layer node is further configured to receive the broadcast message on the broadcast frequency and to send the broadcast message using a second broadcast frequency, wherein the second broadcast frequency is associated with the second-layer node.

10. The system of claim 9 wherein the second-layer node is further configured to identify the broadcast frequency of the preferred node based on the broadcast frequency being offset by a predetermined number of frequency channels from the point-to-point frequency and the third-layer node is configured to identify the second broadcast frequency of the second-layer node based on the second broadcast frequency being offset by the predetermined number of frequency channels from the receive frequency.

11. The system of claim 9 wherein the broadcast frequency is distinct from the point-to-point frequency.

12. The system of claim 9 wherein the preferred node is selected by the second-layer node from a plurality of nodes based on a comparison of at least one of transmission time, baud rate, tickle success rate, and data success rate, and based on the preferred node's logical proximity to the collector node.

13. The system of claim 12 wherein the second-layer node is further configured to select, subsequent to selecting the preferred node, another node as a subsequent preferred node that facilitates communication to the collector node by the second-layer node.

14. The system of claim 9 wherein the second-layer node includes one radio associated with point-to-point communications and a second radio associated with broadcast communications.

15. The system of claim 9 wherein the second-layer node is further configured to hop between a predetermined plurality of frequencies reserved for point-to-point communications and a second predetermined plurality of frequencies reserved for broadcast communications.

16. A non-transitory computer-readable storage medium having computer executable instructions for:
identifying, at a node in a mesh network, a point-to-point frequency for sending a point-to-point message to a preferred node, wherein the preferred node is an upper layer node;
identifying, at the node, a broadcast frequency of the preferred node, wherein the broadcast frequency is distinct from the point-to-point frequency;
identifying, at the node, a receive frequency for receiving a point-to-point message from a lower layer node;
identifying, at the node, a second broadcast frequency for broadcasting messages from the node;
simultaneously listening, at the node, to both the broadcast frequency and the receive frequency, wherein the broadcast frequency is different from the receive frequency;
receiving a broadcast message at the node on the broadcast frequency; and
sending, at the node, the broadcast message using the second broadcast frequency.

17. The non-transitory computer-readable storage medium of claim 16, wherein identifying the broadcast frequency comprises determining the broadcast frequency based on the broadcast frequency being offset by a predetermined number of frequency channels from the point-to-point frequency.

18. The non-transitory computer-readable storage medium of claim 16, wherein a predetermined plurality of frequencies are reserved for broadcast communication and a predetermined plurality of frequencies are reserved for point-to-point communication.

19. The non-transitory computer-readable storage medium of claim 16, further comprising instructions for:
listening, at the node, to a third broadcast frequency, wherein the third broadcast frequency is associated with another node.

20. The system of claim 9, wherein the preferred node is configured to facilitate communication to the collector node from the second-layer node, wherein the preferred node being in the first layer and the second-layer node being in the second layer comprises the preferred node having a higher connection quality with respect to the collector node than the second-layer node;
wherein the second-layer node is configured to identify the point-to-point frequency for sending the point-to-point message to the preferred node based on a communication link between the preferred node and the node having a higher quality than an additional communication link between the second-layer node and an additional node in the first layer;
wherein the second-layer node being in the second layer and the third-layer node being in the third layer comprises the second-layer node having a higher connection quality with respect to the collector node than the third-layer node.

21. The system of claim 9, wherein the broadcast message comprises information to be distributed to multiple nodes in the mesh network and the point-to-point message comprises information addressed to a specific node in the mesh network.

* * * * *